2,888,414

PROCESS OF PREPARING AN OPEN CELL POLYVINYL CHLORIDE SPONGE

Mack Francis Fuller, Woodbury, N.J., assignor to E. I. du Pont de Nemours and Company, Wilmington, Del., a corporation of Delaware No Drawing. Application August 22, 1956
Serial No. 605,476

1 Claim. (Cl. 260—2.5)

This invention relates to the manufacture of expanded cellular materials. More particularly, this invention relates to the manufacture of expanded cellular polyvinyl chloride materials in bulk by means of a chemical blowing agent.

This application is a continuation-in-part of my prior application Serial No. 343,265, filed March 18, 1953.

The prior art discloses a wide variety of manufacturing techniques for the production of expanded cellular polyvinyl chloride materials (sometimes called polyvinyl chloride sponge). The expansion of the polyvinyl chloride may be accomplished mechanically by the use of an inert gas under pressure, or a chemical blowing agent may be used which decomposes upon heating to release a gas. Where the cellular polyvinyl chloride material is intended for use in articles such as shoe inner soles, floats, or padding for athletic equipment, expansion of the polyvinyl chloride is normally carried out at superatmospheric pressure in a closed mold. Cellular materials produced in this fashion are characterized by individual cells and are referred to as "unicellular" or "closed cell" sponge. Cellular materials useful for making toys, padding, cushioning, coat interliners, etc. are prepared under atmospheric pressure conditions; they may contain some closed cells but generally have a continuous, interconnected cell structure and are called "open-cell" sponge.

It is an object of the present invention to provide a novel process for the preparation of open-cell polyvinyl chloride sponge without the use of gas-tight molds or pressure equipment. It is a further object of the invention to provide a process of the aforementioned type which can be carried out at moderate temperatures and at atmospheric pressure conditions. It is a still further object of the invention to provide a process which is convenient, economical, and consistently produces a fine, high-quality sponge product. These and other objects will become apparent from a consideration of the ensuing specification and claim.

Broadly stated, my invention involves the use, in an atmospheric blowing process, of a chemical blowing agent which will undergo thermal decomposition and release a gas at a temperature below a polyvinyl chloride temperature at which the plastisol passes from a liquid state to a gel state. By "plastisol," I mean the polyvinyl chloride resin combined with sufficient plasticizer to form a fluid composition and containing any of the customary compounding ingredients such as stabilizers, pigments, fillers, etc. This technique differs distinctly from prior art atmospheric blowing processes wherein the polyvinyl chloride plastisol is heated to a temperature at which it gels and fluxes and then heated further to decompose the blowing agent, whereby the molten fluxed mass is then expanded.

Formerly, it was believed that only a fluxed plastisol had sufficient viscosity to retain the gas formed by decomposition of the blowing agent at atmospheric pressure. I have now found that I can obtain high quality polyvinyl chloride sponge products with an atmospheric blowing process using chemical blowing agents which undergo thermal decomposition at temperatures below the gelation temperature of the plastisol. By my process, heating of the plastisol first causes decomposition of the blowing agent. The gases which are thereby released are dispersed throughout the liquid plastisol to give a highly expanded, fragile, mobile foam. Further heating causes the foam to "set" as a result of gelation. Still further heating serves to toughen the gelled foam by fluxing the resin with the plasticizer.

A better understanding of the invention will be obtained from a consideration of the following specific examples:

*Example 1*

A plastisol was prepared by stirring together the following ingredients:

| | Parts |
|---|---|
| Plastisol grade polyvinyl chloride | 100 |
| Di-2-ethylhexyl phthalate (plasticizer) | 125 |
| Basic lead carbonate | 5 |
| Dinitrosopentamethylenetetramine (blowing agent) | 4 |
| Citric acid | 2 |

The plastisol was poured into a paper tray to a depth of $9/16''$ and heated in an oven at 100° C. for 30 min. The tray was then transferred to an oven at 150° C. and heated for 20 min. The expanded composition thus obtained had a volume 2½ times that of the original plastisol, had a medium-fine, uniform, continuous cell structure, and was very light cream in color.

*Example 2*

A plastisol was prepared by stirring together the following ingredients:

| | Parts |
|---|---|
| Plastisol grade polyvinyl chloride | 100 |
| Di-2-ethylhexyl phthalate (plasticizer) | 100 |
| Chlorinated paraffin (40% chlorine) (plasticizer) | 50 |
| Basic lead carbonate | 5 |
| N,N' - dimethyl, N,N' - dinitroso terephthalamide (blowing agent) | 10 |

The plastisol was poured into an open aluminum tray to a depth of $1/8''$ and heated in an oven at 100° C. for 30 minutes. The tray was then transferred to an oven at 150° C. and heated for 30 minutes. The expanded composition thus obtained was a white, tough, resilient sponge, which was one inch thick and free of objectionable odor, and had a fine, uniform, continuous cell structure.

The invention has been exemplified for the preparation of cellular polyvinyl chloride materials since I envision that it will have its greatest utility in this connection. It will be readily apparent, however, that my novel process is useful for the expansion of other and different thermoplastic organic resins, especially mixtures of polyvinyl chloride with minor amounts of copolymers of vinyl chloride with vinyl acetate, diethyl maleate, diethyl fumarate, vinylidene chloride and and the like.

My invention is not limited to any single blowing agent. As is apparent from the foregoing examples, numerous blowing agents are operative. The only critical limitation on the suitability of the blowing agent is that it be capable of decomposing and releasing gas rapidly to foam the polyvinyl chloride plastisol at a temperature below that at which the plastisol passes from a liquid to a gel state.

In order that decomposition of the blowing agent may be completed before gelation of the plastisol occurs, I normally foam the plastisol in an oven with an air temperature set substantially below the known gel point. Under certain conditions, however, for example, foaming in thick-walled molds or in relatively thin layers on insulating substrata such as paper or fabric, the heat transfer characteristics of the system permit complete decomposition of the blowing agent before the plastisol is gelled, even though the air temperature of the oven may be higher than the plastisol gelation temperature. A critical feature of this invention is that heating of the plastisol be conducted in such a manner that the blowing agent be essentially completely decomposed before the gelation temperature of the plastisol is reached. As a highly plasticized polyvinyl chloride composition, the so-called "plastisol," is raised from ordinary room temperatures, it remains in a definite liquid state (though usually increasing in viscosity) until a temperature is reached which causes the plastisol to pass from a mobile, flowable state to a relatively immobile or gel state. The gel state is achieved principally as a result of temperature but also is affected by the time at which a composition is heated at a given temperature. The susceptibility of a resin to solvation by a plasticizer determines the temperature at which a composition ceases to be a liquid and becomes a gel. As the composition is heated further, it passes from the gel stage to the fluxed, or fused, stage in which the resin and plasticizer become dissolved in each other in a single phase formation. In this last stage the composition is again mobile to some extent at elevated temperatures and to some extent foamable. However, the mobility and foamability of the composition in the fused stage is much less than the liquid plastisol prior to gelation. Prior art blowing techniques at atmospheric pressure are nevertheless all directed to expansion of the plastisol in the fused stage. The present invention takes advantage of the greater mobility and foamability of the unfluxed plastisol.

My novel concept contravenes what has heretofore been the accepted theory and practice in the art of preparing cellular polyvinyl chloride materials at atmospheric pressure. It was formerly believed that foaming of the liquid plastisol at atmospheric pressure prior to gelation and fluxing would yield very low quality sponge products, perhaps even completely unexpanded. The prior art suggests that the gaseous decomposition products of the blowing agent at atmospheric pressure would quickly dissipate if the plastisol were ungelled, unfluxed, and still liquid when the blowing agent decomposes. Not only have I found this not to be the case, but I have succeeded in preparing sponge products of a relatively low density (i.e., highly expanded) in thick sections. With my novel process, I have prepared plastic sponge in sections up to 8 inches thick having densities as low as 4 pounds per cubic foot at atmospheric pressure and without the use of costly and complicated pressure equipment.

The basic components of the plastisol which I use in my process are the polyvinyl chloride resin, a plasticizer, and a chemical blowing agent which decomposes at a temperature lower than the gelation temperature of the plastisol. Other compounding ingredients may be present in the plastisol, but are not critical. Thus, the plastisol may contain such additives as stabilizers, pigments, anti-oxidants, activators, etc.

The invention is not limited to any particular plasticizer or class of plasticizers. Any conventional plasticizer for the polyvinyl chloride is suitable provided it meets the customary standards of compatibility, stability, etc. In the case of polyvinyl chloride resins, there are many well-known plasticizers that have long been in use such as didecylphthalate, dioctyl sebacate, di-2-ethylhexyl phthalate, dioctyl adipate, etc. Numerous polymeric plasticizers are operative, and are in many cases preferred. The quantity of plasticizer used may vary between about 50 and 160 parts per 100 parts of resin, depending upon the properties desired in the product; it is typically in the neighborhood of 100 parts of plasticizer per 100 parts of the polyvinyl chloride resin.

The precise temperature at which the blowing agent commences to undergo thermal decomposition is not critical provided only that decomposition is substantially complete at a temperature below the gelation temperature of the plastisol. The latter temperature will vary somewhat from case to case depending upon the particular polyvinyl chloride resin and the amount of plasticizer used. With most polyvinyl chloride plastisols compounded for foaming, gelation usually occurs in the range of about 100°–150° C. and most frequently at some temperature between about 120°–140° C. The preparation of expanded cellular polyvinyl chloride materials according to the present invention thus requires a blowing agent which undergoes, in the plastisol composition, extensive thermal decomposition at temperatures below about 130° C. For storage and shipment purposes, the blowing agent will desirably be relatively stable at ordinary room temperatures and will not commence to undergo any substantial thermal decomposition until the temperature of the environment exceeds such temperatures, i.e., at about 60° C. or higher. There are numerous blowing agents which fit this description including, for example, N,N′-dinitroso N,N′-dimethyl terephthalamide; N,N′-dinitroso N,N′-dimethyl adipamide; N,N′-dinitroso N,N′-dimethyl succinamide; N,N′-dinitroso, N,N′-dimethyl sebacamide; ethylene bis (-nitroso benzamide); p-(t-butyl) benzazide; p-carbomethoxybenzazide; N,N′-dinitroso N,N′-dimethyl 4,4′-bibenzamide; $\alpha,\alpha'$ azobis (isobutyronitrile); acid-activated dinitrosopentamethylenetetramine, etc.

The proportion of the blowing agent in the plastisol may also vary widely depending upon the degree of expansion desired in the cellular product. In a typical case, the plastisol will contain about 2–14 parts of blowing agent, by weight, per 100 parts of the resin. Up to 21 parts of blowing agent per 100 parts of resin is generally operable.

The expanded cellular products produced by the process of the present invention are useful for a wide variety of cushioning and insulating functions including, for example, upholstery filler, crash pads, padding and insulation for clothing, acoustical insulation, rug underlay and the like.

Having thus described my invention, I intend to be limited only by the following claim.

I claim:

A process for preparing an open-cell polyvinyl chloride sponge which includes the steps of forming a fluid plastisol by mixing a polyvinyl chloride resin and a suitable plasticizer therefor, adding a compound to said plastisol which wil decompose upon heating to rapidly release a gas at a temperature between about 60° and 130° C., heating the mixture of the plastisol and the compound at atmospheric pressure to a temperature between about 60° and 130° C. to decompose the compound and release a gas which will transform the liquid plastisol into a greatly expanded fragile foam, and thereafter heating the fragile foam to a higher temperature between about 130° C. and the flux point of the plastisol to gel the plastisol and flux the polyvinyl chloride with the plasticizer.

References Cited in the file of this patent

UNITED STATES PATENTS

| | | |
|---|---|---|
| 2,447,056 | Cooper | Aug. 17, 1948 |
| 2,525,880 | Feldman | Oct. 17, 1950 |
| 2,525,966 | Smith et al. | Oct. 17, 1950 |